US009741013B2

(12) United States Patent
Chiu et al.

(10) Patent No.: US 9,741,013 B2
(45) Date of Patent: Aug. 22, 2017

(54) OBJECT LOCATION GUIDING DEVICE AND OPERATION METHOD THEREOF

(71) Applicants: Industrial Technology Research Institute, Hsinchu (TW); Changhua Christian Hospital, Changhua (TW)

(72) Inventors: Troy-Chi Chiu, Taoyuan County (TW); Chin-Chung Nien, Hsinchu (TW); Li-Huei Chen, Hsinchu (TW); Su-Yu Chien, Changhua County (TW); Jo-Ping Li, New Taipei (TW); Cheng-Hsun Yang, New Taipei (TW); Pai-Hsiang Chou, Hsinchu County (TW)

(73) Assignees: Industrial Technology Research Institute, Hsinchu (TW); Changhua Christian Hospital, Changhua (TW)

( * ) Notice: Subject to any disclaimer, the term of this patent is extended or adjusted under 35 U.S.C. 154(b) by 0 days.

(21) Appl. No.: 14/973,741

(22) Filed: Dec. 18, 2015

(65) Prior Publication Data
US 2016/0180285 A1 Jun. 23, 2016

(30) Foreign Application Priority Data

Dec. 19, 2014 (TW) .............................. 103144518 A
Oct. 29, 2015 (TW) .............................. 104135564 A (51) Int. Cl.
*G06F 7/00* (2006.01)
*G06Q 10/08* (2012.01)

(52) U.S. Cl.
CPC ................................. *G06Q 10/087* (2013.01)

(58) Field of Classification Search
None
See application file for complete search history.

(56) References Cited

U.S. PATENT DOCUMENTS 5,159,581 A 10/1992 Agans
5,745,366 A 4/1998 Higham et al.
(Continued)

FOREIGN PATENT DOCUMENTS

CN 201361240 12/2009
CN 201469573 5/2010
(Continued)

OTHER PUBLICATIONS

Zhangjun Song, et al., "Automatic Deploying System for Single-ingredient Pellet Formulas of Traditional Chinese Medicines," Proceeding of the IEEE International Conference on Robotics and Biomimetics (ROBIO), Dec. 2013, pp. 780-785.
(Continued)

*Primary Examiner* — Yolanda Cumbess
(74) *Attorney, Agent, or Firm* — Jianq Chyun IP Office (57) ABSTRACT

An object location guiding device and an operation method thereof are provided. The object location guiding device includes a processor, a controller and a guiding element array. Guiding elements of the guiding element array are disposed at different positions in a field so as to point to storage positions of different objects in the field. The processor converts the object data on an object list into storage-position information. The controller receives the storage-position information from the processor, converts the storage-position information into a first axis position code and a second axis position code, and drives the guiding element array by using the first axis position code and the second axis position code, so as to allow at least one corresponding guiding element of the guiding elements to point to a storage position of a corresponding object in the field.

19 Claims, 9 Drawing Sheets

(56) References Cited

U.S. PATENT DOCUMENTS

| | | | |
|---|---|---|---|
| 7,502,666 | B2 | 3/2009 | Siegel et al. |
| 8,661,100 | B2 | 2/2014 | Owen |
| 8,794,482 | B2 | 8/2014 | Sack et al. |
| 2005/0125097 | A1 | 6/2005 | Chudy et al. |
| 2009/0243797 | A1 | 10/2009 | Leung et al. |
| 2013/0070090 | A1 | 3/2013 | Bufalini et al. |
| 2013/0082581 | A1* | 4/2013 | Bufalini .............. G07F 11/62 312/209 |
| 2013/0138539 | A1* | 5/2013 | Delaney .............. G06Q 50/22 705/28 |

FOREIGN PATENT DOCUMENTS

| | | |
|---|---|---|
| CN | 103552794 | 2/2014 |
| TW | 200704613 | 2/2007 |
| TW | 200733915 | 9/2007 |
| TW | M366344 | 10/2009 |
| TW | 201009633 | 3/2010 |
| TW | M392660 | 11/2010 |
| TW | M426409 | 4/2012 |

OTHER PUBLICATIONS

H. Nakano, et al., "A Wideband Low-Profile Antenna Composed of a Conducting Body of Revolution and a Shorted Parasitic Ring," IEEE Transactions on Antennas and Propagation, vol. 56, No. 4, Apr. 2008, pp. 1187-1192.

Shih-Huang Yeh, et al., "A Low-Profile Cylindrical Monopole Antenna," 2001 Asia-Pacific Microwave Conference (APMC), vol. 3, Dec. 3-6, 2001, pp. 1179-1182.

Takanori Noro, et al., "A Low Profile and Wideband Top-Loaded Monopole Antenna with Shorting Posts," 2006 IEEE International Workshop on Antenna Technology Small Antennas and Novel Metamaterials, Mar. 6-8, 2006, pp. 108-111.

Y.T. Chen, et al., "Design a Wireless Radio Frequency Identification based Intelligent Drug Preparation System," Proceedings of the 5th International Conference on Information Technology and Application in Biomedicine, in conjunction with The 2nd International Symposium & Summer School on Biomedical and Health Engineering, May 30-31, 2008, pp. 549-551.

Takuo Suzuki, et al., "Intelligent Medicine Case for Dosing Monitoring and Support," The 2010 IEEE/RSJ International Conference on Intelligent Robots and Systems, Oct. 18-22, 2010, pp. 3471-3476.

Chung Yeh, et al., "The Study of Retrieval and Storage for Chinese Herb Hospital," Logistics Research Review, vol. 2, Dec. 2002 pp. 39-84.

S.C. Shieh, et al., "Using RFID Technology on Clinic's Pharmacy Operation Management and Development of Intelligent Medicine Dispensing Cabinet," IEEE International Conference on Industrial Engineering and Engineering Management (IEEM), Dec. 8-11, 2008, pp. 2006-2009.

"Office Action of Taiwan Counterpart Application", issued on Feb. 21, 2017, p. 1-p. 8.

* cited by examiner

OBJECT LOCATION GUIDING DEVICE AND OPERATION METHOD THEREOF

CROSS-REFERENCE TO RELATED APPLICATION

This application claims the priority benefit of Taiwan application serial no. 103144518, filed on Dec. 19, 2014, and Taiwan application serial no. 104135564, filed on Oct. 29, 2015. The entirety of each of the above-mentioned patent applications is hereby incorporated by reference herein and made a part of this specification.

TECHNICAL FIELD

This disclosure relates to an object location guiding device and an operation method thereof.

BACKGROUND

In general, an object is not able to be located quickly and accurately in a normal warehouse, market shelves, logistics, and pharmacy management system such as medical institutes. A pharmacist in a medical institute dispenses and makes up a prescription from a doctor. Under a large workload, the pharmacist has to accurately locate target medicine from one or more medicine cabinets as soon as possible. However, it is difficult for a human to remember storage positions of a large variety of medicine. The pharmacist may spend a lot of time on searching for a storage position of target medicine. Moreover, the pharmacist may mistake medicine names listed on the prescription or obtain medicine placed on wrong positions. To ensure the pharmacist to make up prescriptions from the doctor to reduce medication error and medical malpractice due to human carelessness as well as to enhance the effectiveness to make up prescriptions is an issue to be solved.

SUMMARY

An object location guiding device is provided in the embodiments of the disclosure. The object position guiding device includes a processor, a controller, and a guiding element array, where the guiding element array includes multiple guiding elements. The guiding elements may be disposed at different positions in a field so as to point to storage positions of different objects in the field. The processor may convert object data in an object list to storage-position information. The controller may receive the storage-position information from the processor, convert the storage-position information to a first-axis position code and a second-axis position code, and drive the guiding element array by using the first-axis position code and the second-axis position code so as to allow at least one corresponding guiding element among the guiding elements to point to a storage position of a corresponding object in the field.

An operation method of an object location guiding device is provided in the embodiments of the disclosure. The operation method includes the following steps: disposing multiple guiding elements of a guiding element array at different positions in a field so as to point to storage positions of different objects in the field; converting object data in an object list to storage-position information by a processor; converting the storage-position information to a first-axis position code and a second-axis position code by a controller; and driving the guiding element array by using the first-axis position code and the second-axis position code so as to allow at least one corresponding guiding element among the guiding elements to point to a storage position of a corresponding object in the field.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

In summary, the object position guiding device and the operation thereof in the embodiments of the disclosure may convert object data to storage-position information and further convert the storage-position information to a first-axis position code and a second-axis position code. The first-axis position code and the second-axis position code are used for driving the guiding element array so as to allow at least one corresponding guiding element among the guiding elements to point to a storage position of a corresponding object in the field. Hence, the object position guiding device and the operation thereof allow the user to locate a target object in the field in a quick and accurate fashion.

Figure 1:
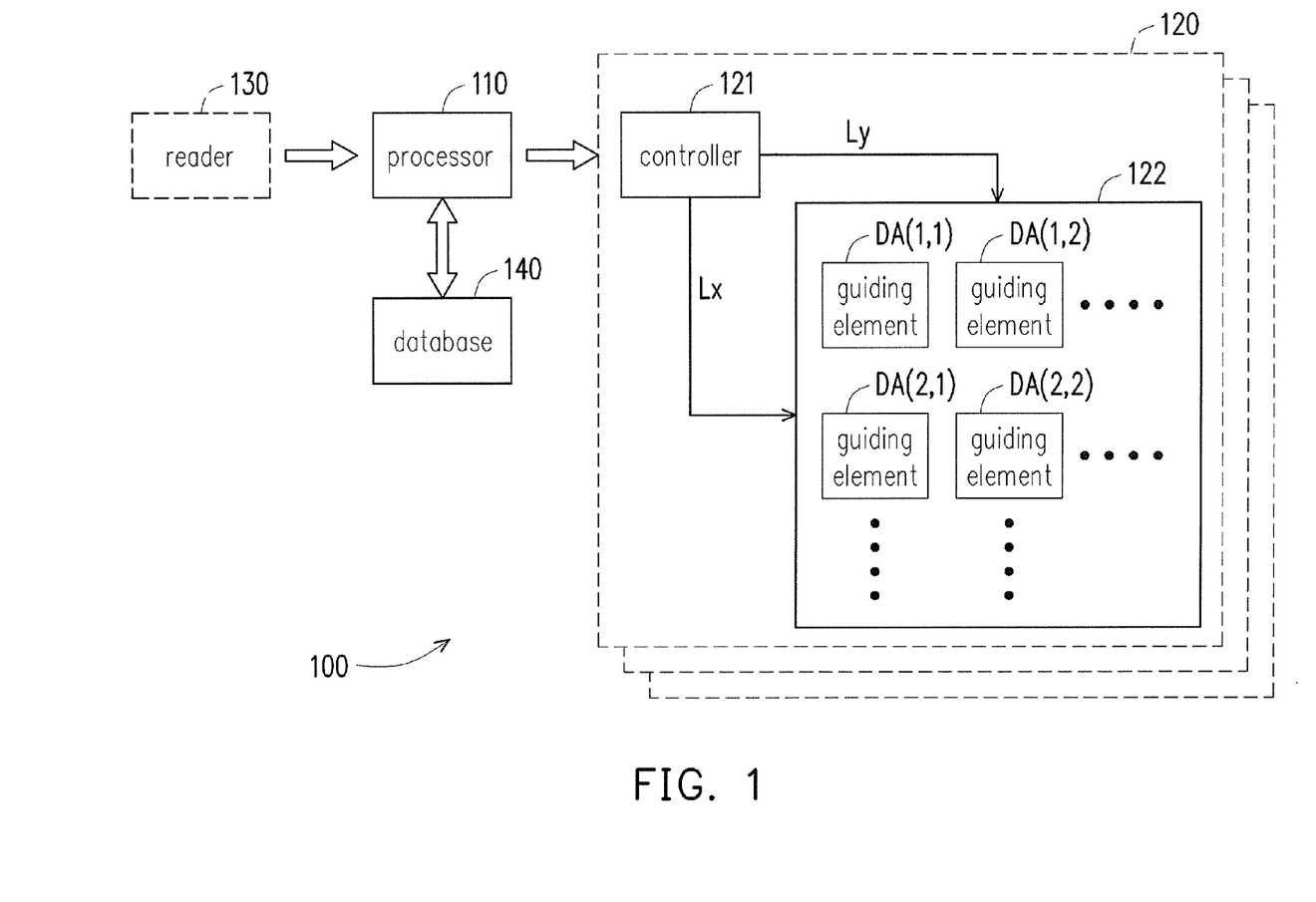
FIG. 1 illustrates a block diagram of circuitry of an object location guiding device according to an embodiment of the disclosure.

FIG. 1 illustrates a block diagram of circuitry of an object location guiding device 100 according to an embodiment of the disclosure. The object location guiding device 100 includes a processor 110 and a guiding module 120. The number of the guiding module 120 may depend on actual needs. For example, assume that the object location guiding device 100 is applied to, but not limited to, a field having a medicine cabinet. Also, assume that the medicine cabinet further includes five drawers, where each of the drawers includes multiple cases for storing different types of medicine. The number of the guiding module 120 may thus be five (or more). Each of the guiding modules 120 may be disposed at different drawers in the medicine cabinet so as to point to storing positions of different objects (e.g., medicine) in the field. Although a medicine cabinet in a medical institution is illustrated herein, the disclosure is also applicable to warehouse, market shelves, logistics, and pharmacy management system.

As another example, assume that the object location guiding device 100 is applied to a field having ten storage shelves (e.g., a logistics warehouse). Also, assume that each of the storage shelves further includes multiple cases for storing different types of items. The number of the guiding module 120 may thus be ten (or more). The guiding modules 120 may be respectively disposed at different storage shelves so as to point to storing positions of different objects (e.g., items) in the field.

One guiding module 120 would be described hereafter, and the other guiding modules could refer to the description of the guiding module 120. The guiding module 120 includes a controller 121 and a guiding element array 122. The controller 121 is coupled to the guiding element array 122. The guiding element array 122 includes multiple guiding elements such as DA(1,1), DA(1,2), DA(2,1) and DA(2, 2) illustrated in FIG. 1.

Figure 2:
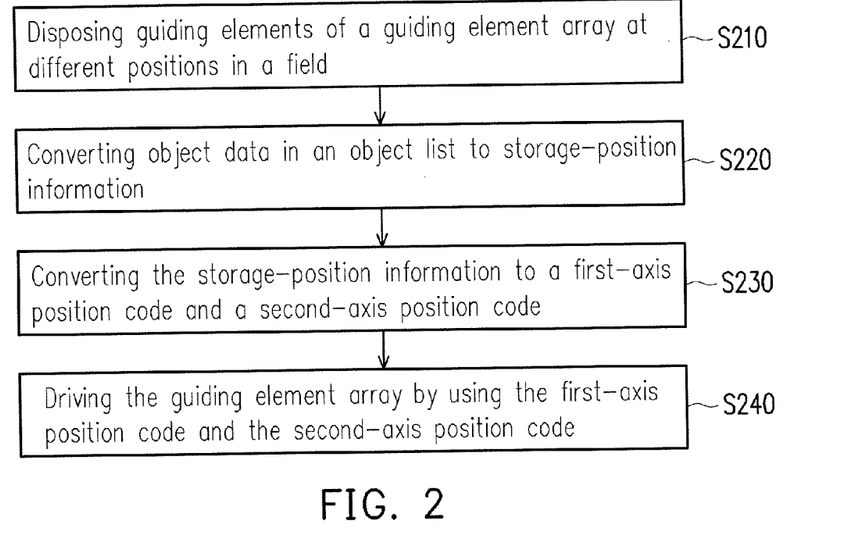
FIG. 2 illustrates a flowchart of an operation method of an object location guiding device according to an embodiment of the disclosure.

FIG. 2 illustrates a flowchart of an operation method of an object location guiding device according to an embodiment of the disclosure. Referring to both FIG. 1 and FIG. 2, in Step S210, the guiding elements DA(1,1), DA(1,2), DA(2, 1), DA(2,2) and/or other guiding elements may be disposed at different positions in a field so as to point to storage positions of different objects in the field. Based on design needs, these guiding elements may include light-emitting elements, sounding elements, and/or other elements for notification. Light emitting idode (LED) would be used as the guiding elements in the following embodiments.

The processor 110 and the controller 121 may communicate with each other via a wired or wireless communication interface. The wireless communication interface could be a Wireless Fidelity (WiFi) communication interface, a Bluetooth communication interface, a ZigBee communication interface, and/or other wireless communication interfaces. The wired communication interface could be a local area network (LAN) interface, a Universal Serial Bus (USB) interface, and/or other wired communication interfaces. Based on design needs, the processor 110 and the controller 121 could have different configurations. In some embodiments, the processor 110 may be a computational platform with communication capability such as a personal computer, a laptop computer, a tabular computer, a mobile phone, or other computational platforms. The controller 121 may be a system-on-chip (SoC) or other communication control chip such as Bluetooth SoC CC2540F128 or CC2540F256 from Texas Instruments. In some other embodiments, the controller 121 may be a microcontroller chip. In some other embodiments, the processor 110 and the controller 121 may be different integrated circuit chips disposed in a same case and connected to each other via a metal electrical path. In other embodiments, the processor 110 and the controller 121 may be embedded in a same integrated circuit chip.

In Step S220, the processor 110 may convert one (or more) piece of object data in an object list to storage-position information. For example, assume that the object location guiding device 100 is applied to, but not limited to, a field having a medicine cabinet. The object list may thus be a prescription from a doctor, and the object data may include medicine names, medicine numbers, and or other medicine information. As another example, assume that the object location guiding device 100 is applied to a field having ten storage shelves (e.g., a logistics warehouse). The object list may thus be a stock order list, and the object data may include item names, item numbers, and/or other item information.

In some other embodiments, the object location guiding device 100 includes multiple guiding modules. The processor 110 not only converts the object data in the object list to the storage-position information, but also converts the object data to a third axis position code Lz. The processor 110 may use the third axis position code Lz in Step S220 to select and enable a corresponding guiding module 120 from the guiding modules. The corresponding guiding module 120 includes a controller 121 and a guiding element array 122.

The way to obtain the object list may depend on design needs. For example, the processor 110 may obtain the object list by using, but not limited to, a reader 130. The reader 130 and the processor 110 may communicate with each other via a wired or wireless communication interface. The wireless communication interface could be a WiFi communication interface, a Bluetooth communication interface, a ZigBee communication interface, and/or other wireless communication interfaces. The wired communication interface could be a LAN interface, a USB interface, and/or other wired communication interfaces. In some embodiments, the reader 130 may be a cell phone, a mobile communication device, a scanner, a camera, a camcorder, and so forth. The processor 110 may capture an image of the object list by using the reader 130, obtain the object data from the image by optical character recognition (OCR), and look up the corresponding storage-position information from a database 140 based on the object data. The database 140 and the processor 110 may communicate with each other via a wired or wireless communication interface. The wireless communication interface could be a WiFi communication interface, a Bluetooth communication interface, a ZigBee communication interface, and/or other wireless communication interfaces. The wired communication interface could be a LAN interface, a USB interface, and/or other wired communication interfaces. In some other embodiments, the reader 130 may be an optical code reader, a magnetic code reader, a near field communication (NFC) reader, and/or other reading equipments. The optical code reader could be a bar code reader, a quick response (QR) code reader, and/or other optical code readers. The processor 110 may read list information from the object list by using the reader 130 and look up the object data from the database 140 according to the list information.

As an example, but not limited to, a pharmacist may use a bar code reader (the reader 130) to read a bar code or a QR code on a prescription (the object list) so as to enter a prescription number (the list information) into the processor 110. The processor 110 may look up a medicine name, a medicine number, and or other medicine information (the object data) in the prescription from the database 140 according to the prescription number. The processor 110 could convert the medicine name to corresponding storage-position information and transmit the corresponding storage-position to the controller 121.

As another example, in some other embodiments, a pharmacist may use a QR code reader (the reader 130) to read a two-dimensional bar code on a prescription (the object list) so as to enter medicine names (the object data) listed on the prescription into the processor 110. The processor 110 may look up corresponding storage-position information from the database 140 according to the medicine names. The processor 110 could transmit the corresponding storage-position information to the controller 121.

In some other embodiments, the reader 130 is not a necessity. The processor 110 may download the object list from a remote host via a communication network. The remote host could be a database server, a front-end computer, or other computational platforms. For example, the remote host may be, but not limited to, a computer in a consulting room used by a doctor. The remote host and the processor 110 may communicate with each other via a wired or wireless communication interface. The wireless communication interface could be a WiFi communication interface, a Bluetooth communication interface, a ZigBee communication interface, and/or other wireless communication interfaces. The wired communication interface could be a LAN interface, a USB interface, and/or other wired communication interfaces.

In Step S230, the controller 121 may receive the storage-position information from the processor 110 and convert the storage-position information to a first-axis position code Lx and a second-axis position code Ly. In Step S240, the controller 121 may drive the guiding element array 122 by using the first-axis position code Lx and the second-axis position code Ly so as to allow at least one corresponding guiding element among the guiding elements (e.g., the guiding elements DA(1,1), DA(1,2), DA(2,1), and DA(2,2) in FIG. 1) to point to a storage position of a corresponding object in the field. In Step S240, the controller 121 may also point to the position of the guiding module 120 by using the third-axis position code Lz.

The first-axis position code Lx, the second-axis position code Ly, and the third-axis position code Lz may be respectively set as an X-axis, a Y-axis, and a Z-axis in a three-dimensional coordinate space. In an embodiment, to cater for multiple drawers and medicine case positions in a medicine cabinet, the guiding modules may be respectively disposed at the different drawers, and the guiding elements may be disposed at different case positions in each of the drawers. Hence, the third-axis position code Lz could select/determine a drawer position (the Z-axis position, i.e., to select a corresponding guiding module from the guiding modules), and the first-axis position code Lx and the second-axis position code Ly may select/determine a medicine case position in a drawer (the X-axis position and the Y-axis position, i.e., to select a corresponding guiding element from the different guiding elements in a guiding module).

As an application scenario, in a pharmacy of a hospital, after a doctor provides a prescription by using a host computer in a consulting room, a host computer in the pharmacy would concurrently print out the prescription (and/or a medicine bag). A pharmacist may read a two-dimensional bar code (e.g., Quick Response Code, QR code) on the prescription (the object list) so as to enter medicine names (the list information) listed on the prescription into the processor 110. The processor 110 may look up corresponding storage-position information from the database 140 according to the medicine names. The processor 110 could transmit the corresponding storage-position information to the controller 121. The controller 121 may convert the storage-position information to a first-axis position code Lx and a second-axis position code Ly. The controller 121 may drive the guiding element array 122 by using the first-axis position code Lx and the second-axis position code Ly so as to allow at least one corresponding guiding element among the guiding elements to point to a storage position of a corresponding medicine in the field.

Figure 3A:
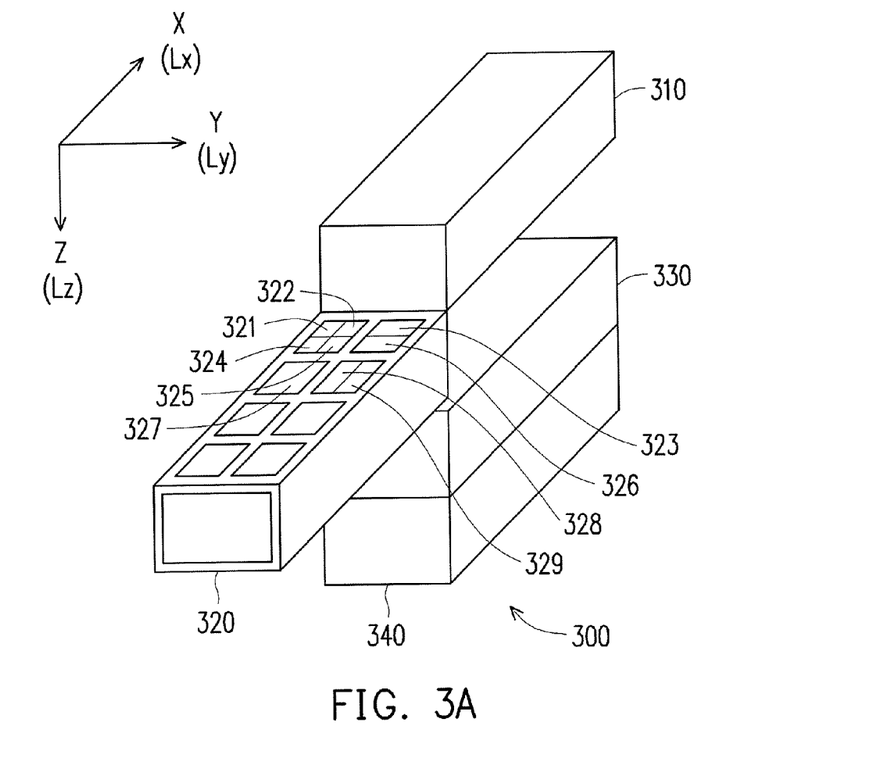
FIG. 3A and FIG. 3B illustrate a scenario where the object position guiding device as illustrated in FIG. 1 is applied to a medicine cabinet.
Figure 3B:
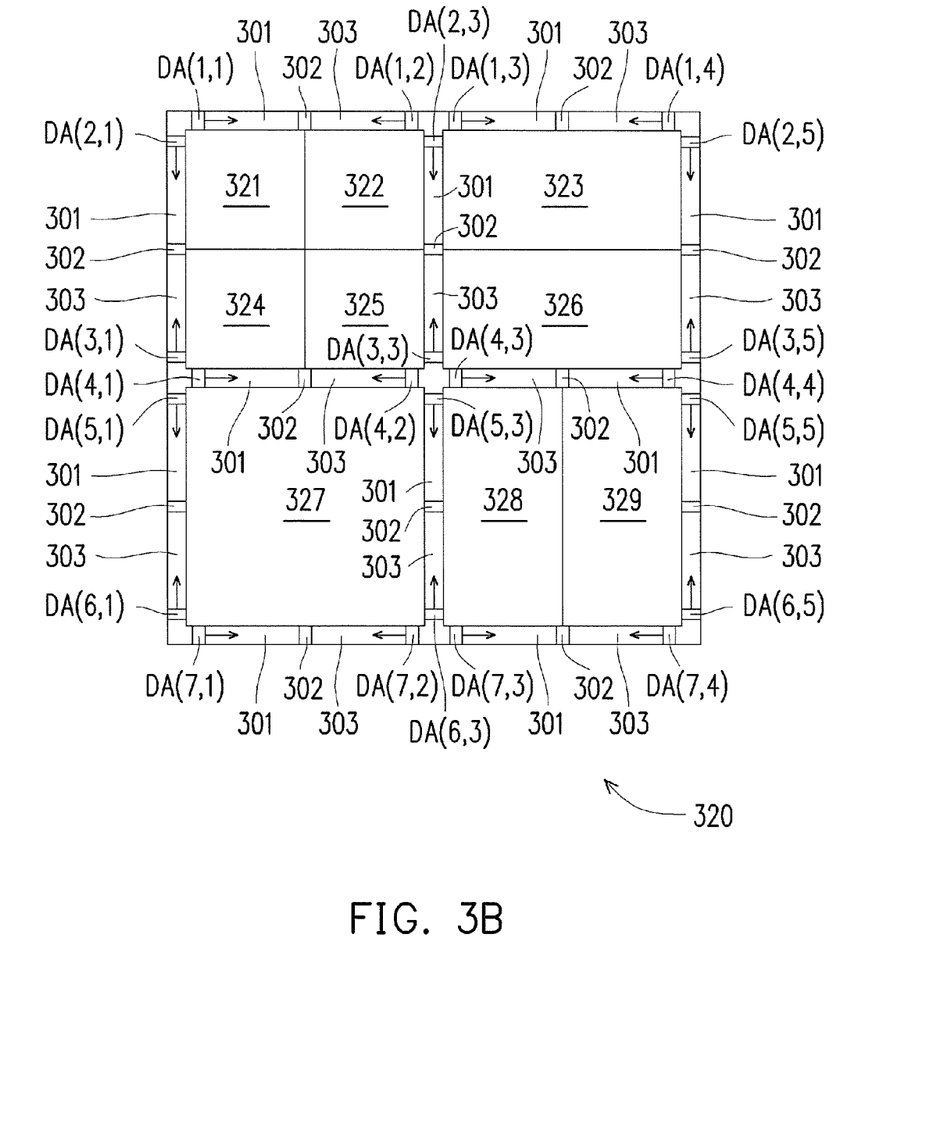

As an example, but not limited to, FIG. 3A and FIG. 3B illustrate a scenario where the object position guiding device 100 is applied to a medicine cabinet 300. The medicine cabinet 300 as illustrated in FIG. 3A includes multiple drawers (e.g., drawers 310, 320, 330, and 340 as illustrated in FIG. 3A), and each of the drawers respectively includes medicine cases with different sizes. For example, the drawer 320 includes cases 321, 322, 323, 324, 325, 326, 327, 328, 329 and other cases with different sizes. To cater for multiple drawers and medicine case positions of the medicine cabinet 300, multiple guiding modules would be respectively disposed at the different drawers, and multiple guiding elements would be respectively disposed at the different medicine case positions. For example, the guiding module 120 may be disposed at the drawer 320, and the multiple guiding elements of the guiding module 120 may be disposed at the different medicine case 321-329 in the drawers 320. Other drawers 310, 330, and 340 may refer to the related description of the drawer 320. Hence, the third-axis position code Lz may select/determine a drawer position (the Z-axis position), and the first-axis position code Lx and the second-axis position code Ly may select/determine a medicine case position in a drawer (the X-axis position and the Y-axis position).

Figure 4:
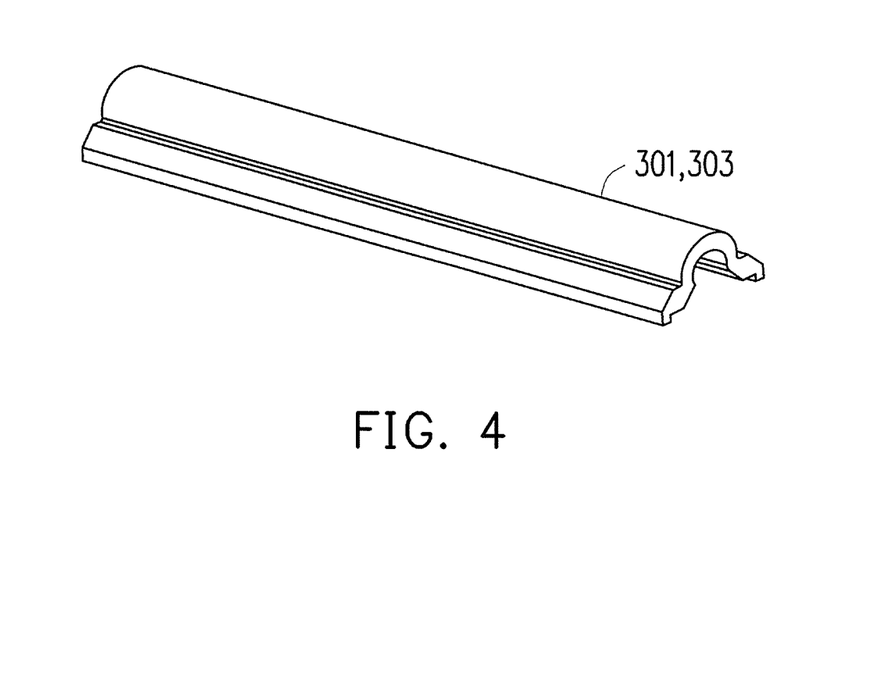
FIG. 4 illustrates a three-dimensional schematic diagram of the light-guiding module 301 or the light-guiding module 303 as illustrated in FIG. 3 according to an embodiment of the disclosure.
Figure 5:
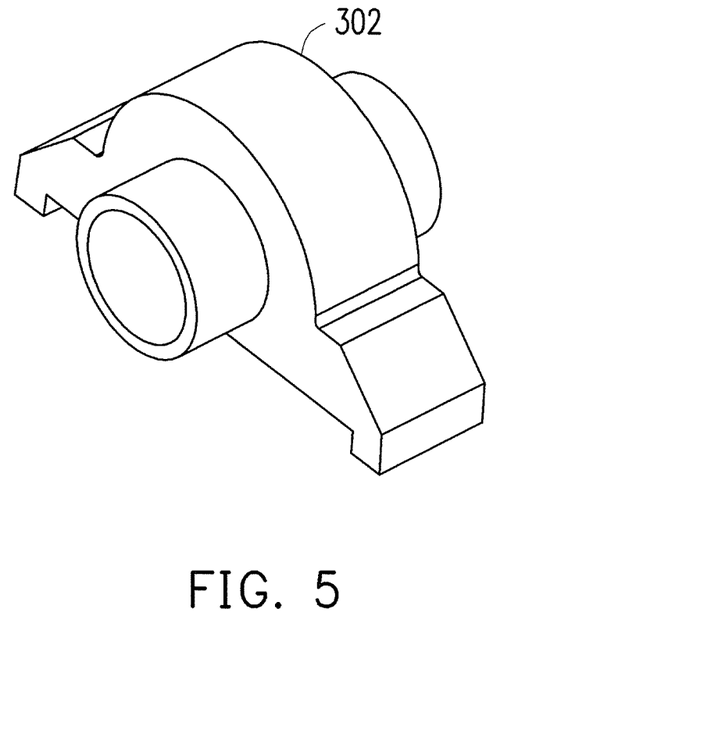
FIG. 5 illustrates a three-dimensional schematic diagram of the light-shading module 302 as illustrated in FIG. 3 according to an embodiment of the disclosure.
Figure 6:
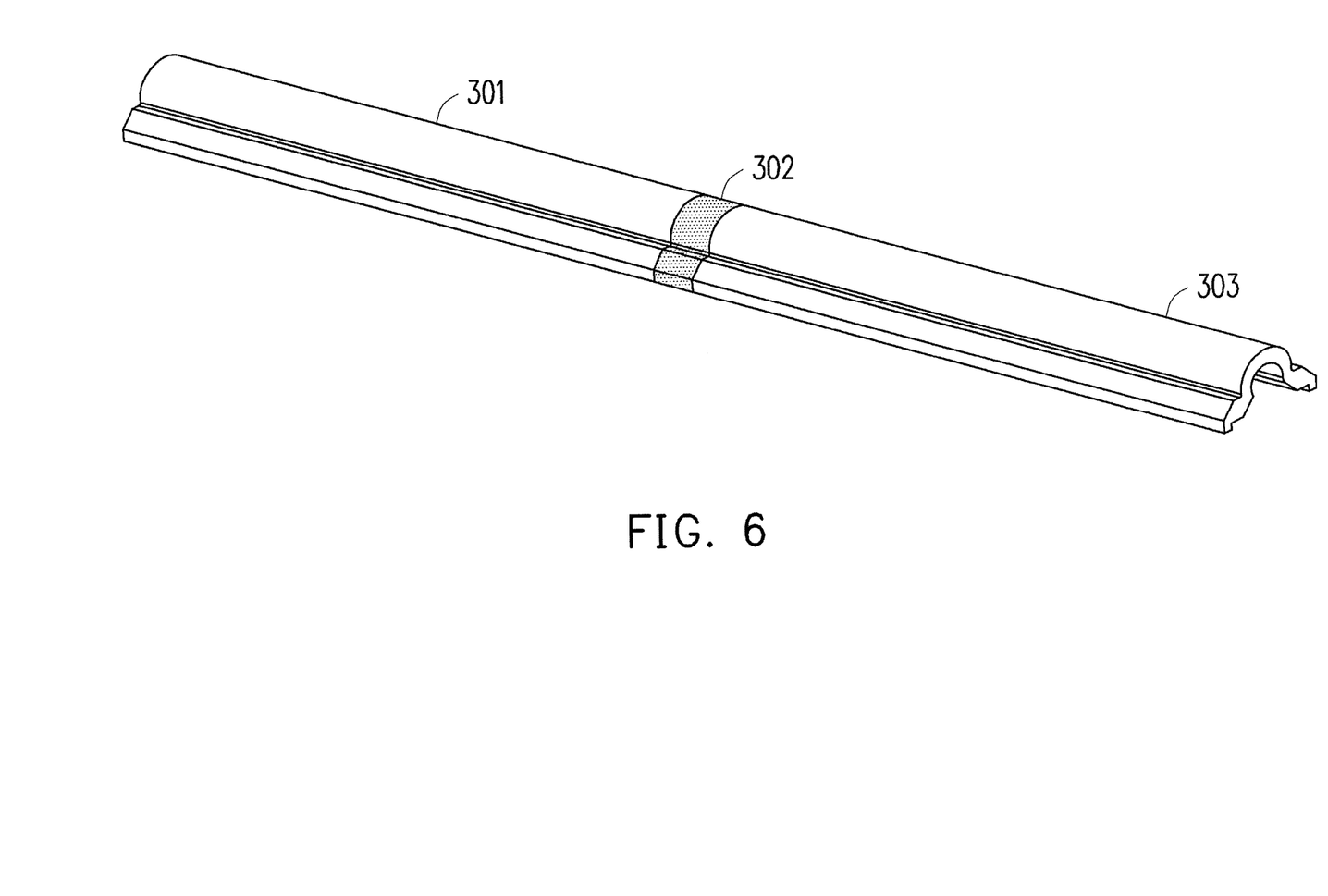
FIG. 6 illustrates a three-dimensional schematic diagram of a combination of the light-guiding module 301, the light-guiding module 303, and the light-shading module 302 as illustrated in FIG. 3 according to an embodiment of the disclosure.

FIG. 3B illustrates a part of the medicine cases 321-329 in the drawer 329 illustrated in FIG. 3A. The other medicine cases in the drawer 320 may refer to the related description of the medicine cases 321-329. The guiding element array 122 of the object position guiding device 100 includes light-emitting guiding elements DA(1,1), DA(1,2), DA(1,3), DA(1,4), DA(2,1), DA(2,3), DA(2,5), DA(3,1), DA(3,3), DA(3,5), DA(4,1), DA(4,2), DA(4,3), DA(4,4), DA(5,1), DA(5,3), DA(5,5), DA(6,1), DA(6,3), DA(6,5), DA(7,1), DA(7,2), DA(7,3), and DA(7,4). Each of the guiding elements respectively includes a light-guiding module 301 or 303. The light-guiding module 301 and 303 are transparent or translucent material. A light-shading element 302 is disposed between the two neighboring light-guiding modules 301 and 303. As an example, FIG. 4 illustrates a three-dimensional schematic diagram of the light-guiding module 301 or the light-guiding module 303 as illustrated in FIG. 3 according to an embodiment of the disclosure. FIG. 5 illustrates a three-dimensional schematic diagram of the light-shading module 302 as illustrated in FIG. 3 according to an embodiment of the disclosure. FIG. 6 illustrates a three-dimensional schematic diagram of a combination of the light-guiding module 301, the light-guiding module 303, and the light-shading module 302 as illustrated in FIG. 3 according to an embodiment of the disclosure.

The processor 110 may covert object data to storage-position information and the third-axis position code Lz in Step S220, and select and enable one corresponding guiding module 120 from the guiding modules by using the third-axis position code Lz. For example, but not limited to, the processor 110 may use the first-axis position code Lz in FIG. 220 so as to select and enable the guiding module 120 corresponding to the drawer 320 from the light guiding module and to disable the guiding modules of the other drawers 310, 330, and 340.

The controller 121 may convert the storage-position information to the first-axis code Lx and the second-axis code Ly in Step S230. In Step 240, the controller 121 may drive the guiding element array 122 of the guiding module 120 by using the first-axis position code Lx and the second-axis position code Ly, and point to the position of the guiding module 120 by using the third-axis position code Lz (i.e., the position of the drawer 320 in the medicine cabinet).

For example, the controller 121 may drive the guiding element array 122 to emit light according to the third-axis position code Lz so as to point to where the drawer 320 of the medicine cabinet 300 is located. Next, when the storage-position information indicates that a target object is stored in the medicine case 321, the controller 121 may drive the guiding elements DA(1,1) and DA(2,1) to emit light. The emitted light may stay on permanently, flicker, or in other guiding manners. The user may be able to quickly and accurately find out the target object according to the emitting guiding elements DA(1,1) and DA(2,1).

Similarly, when the storage-position information indicates that a target object is stored in the medicine case 322, the controller 121 may drive the guiding elements DA(1,1) and DA(2,3) to emit light. When the storage-position information indicates that a target object is stored in the medicine case 324, the controller 121 may drive the guiding elements DA(3,1) and DA(4,1) to emit light. When the storage-position information indicates that a target object is stored in the medicine case 325, the controller 121 may drive the guiding elements DA(3,3) and DA(4,2) to emit light. When the storage-position information indicates that a target object is stored in the medicine case 323, the controller 121 may drive the guiding elements DA(2,3), DA(1,3), DA(1,4), and DA(2,5) to emit light. When the storage-position information indicates that a target object is stored in the medicine case 326, the controller 121 may drive the guiding elements DA(3,3), DA(4,3), DA(4,4), and DA(3,5) to emit light. When the storage-position information indicates that a target object is stored in the medicine case 329, the controller 121 may drive the guiding elements DA(4,4), DA(5,5), DA(6,5), and DA(7,4) to emit light. When the storage-position information indicates that a target object is stored in the medicine case 328, the controller 121 may drive the guiding elements DA(4,3), DA(5,3), DA(6,3), and DA(7,3) to emit light. When the storage-position information indicates that a target object is stored in the medicine case 327, the controller 121 may drive the guiding elements DA(4,1), DA(4,2), DA(5,3), DA(6,3), DA(7,2), DA(7,1), DA(6,1), and DA(5,1) to emit light. When the storage-position information indicates that target objects are stored in the medicine cases 321 and 328, the controller 121 may drive the guiding elements DA(1,1) and DA(2,1) as well as DA(4,3), DA(5,3), DA(6,3), and DA(7,5) to emit light.

Figure 7:
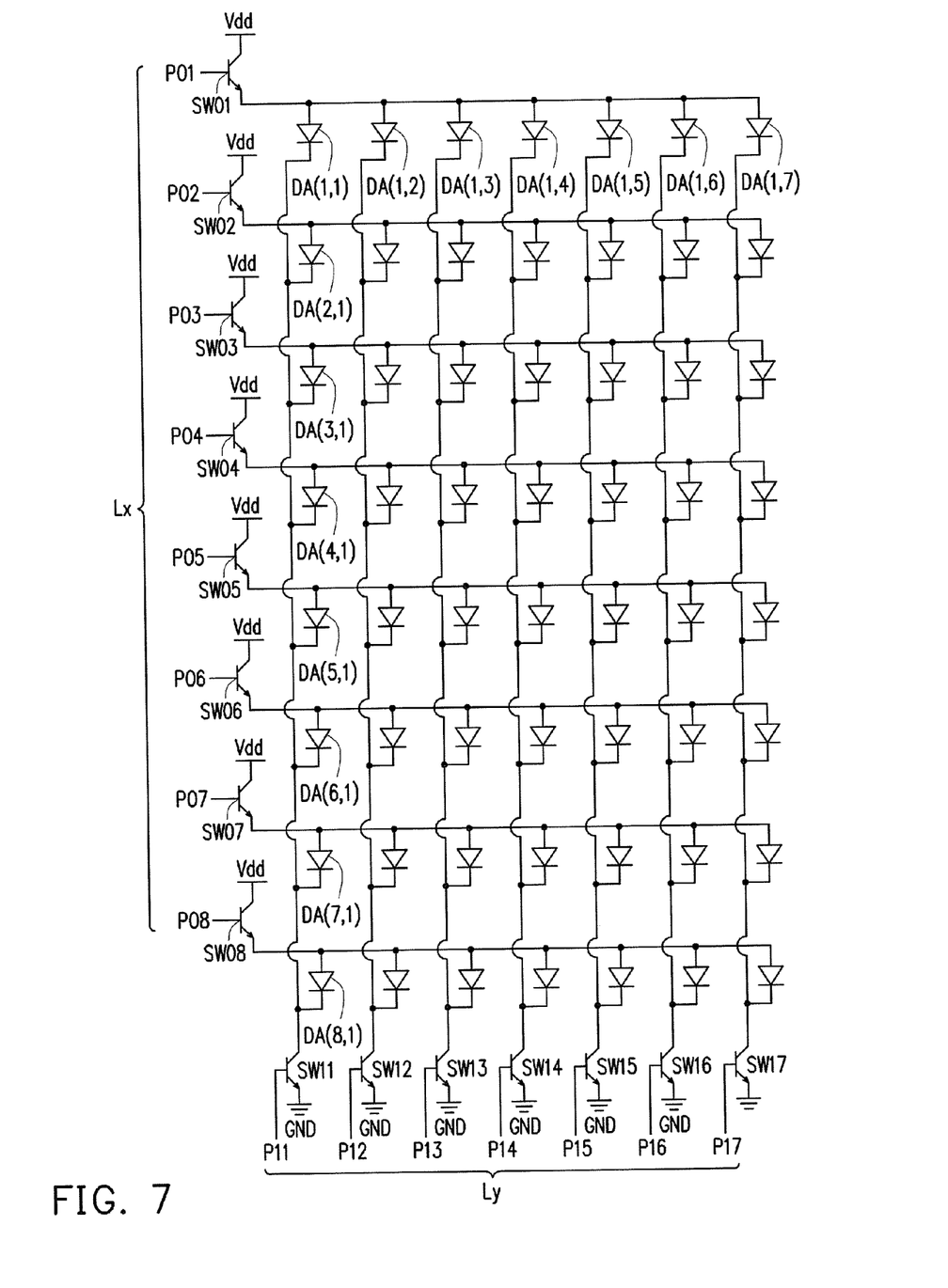
FIG. 7 illustrates a circuitry diagram of the guiding element array as illustrated in FIG. 1 according to an embodiment of the disclosure.

FIG. 7 illustrates a circuitry diagram of the guiding element array 122 as illustrated in FIG. 1 according to an embodiment of the disclosure. In the embodiment of FIG. 7, the guiding element array 122 includes multiple upper switches (e.g., upper switches SW01-SW08), multiple lower switches (e.g., lower switches SW11-SW17), and multiple guiding elements (e.g., guiding element DA(1,1)-DA(1,7) and guiding elements DA(2,1)-DA(8,1)). In the embodiment of FIG. 7, the first-axis position code Lx includes bits P01-P08, and the second-axis position code Ly includes bits P11-P17.

The upper switches SW01, SW02, SW03, SW04, SW05, SW06, SW07 and SW08 are respectively controlled by the different bits of the first-axis position code Lx. A first end of each of the upper switches SW01-SW08 is coupled to a first voltage (e.g., a system voltage Vdd or other power voltages). A second end of each of the upper switches SW01-SW08 is respectively coupled to a first end of the corresponding guiding element. For example, the first upper switch SW01 is controlled by the first bit P01 of the first-axis position code Lx. The first end of the first upper switch SW01 is coupled to the system voltage Vdd. The second end of the first upper switch SW01 is coupled to a first end (e.g., the anode of LED) of each of the guiding elements DA(1,1), DA(1,2), DA(1,3), DA(1,4), DA(1,5), DA(1,6), and DA(1,7) which are in the first row among all the guiding elements. The other upper switches SW02-SW08 may refer to the related description of the upper switch SW01 and would not be repeated hereinafter.

The lower switches SW11, SW12, SW13, SW14, SW15, SW16 and SW17 are respectively controlled by the different bits of the second-axis position code Ly. A first end of each of the lower switches SW11-SW17 is coupled to a second voltage (e.g., a ground voltage GND or other reference voltages). A second end of each of the lower switches SW11-SW17 is respectively coupled to a second end of the corresponding guiding element. For example, the first lower switch SW11 is controlled by the first bit P11 of the second-axis position code Ly. The first end of the first lower switch SW11 is coupled to the ground voltage GND. The second end of the first lower switch SW11 is coupled to a second end (e.g., the cathode of LED) of each of the guiding elements DA(1,1), DA(2,1), DA(3,1), DA(4,1), DA(5,1), DA(6,1), DA(7,1), and DA(8,1) which are in the first column among all the guiding elements. The other lower switches SW12-SW17 may refer to the related description of the lower switch SW11 and would not be repeated hereinafter.

The controller 121 may address/control the guiding element array 122 by using the first-axis position code Lx and the second-axis position code Ly. For example, when the voltages of the bits P01 and P11 are in high logic levels, both of the upper switch SW01 and the lower switch SW11 are conducted so that the guiding element DA(1,1) is able to emit.

Figure 8:
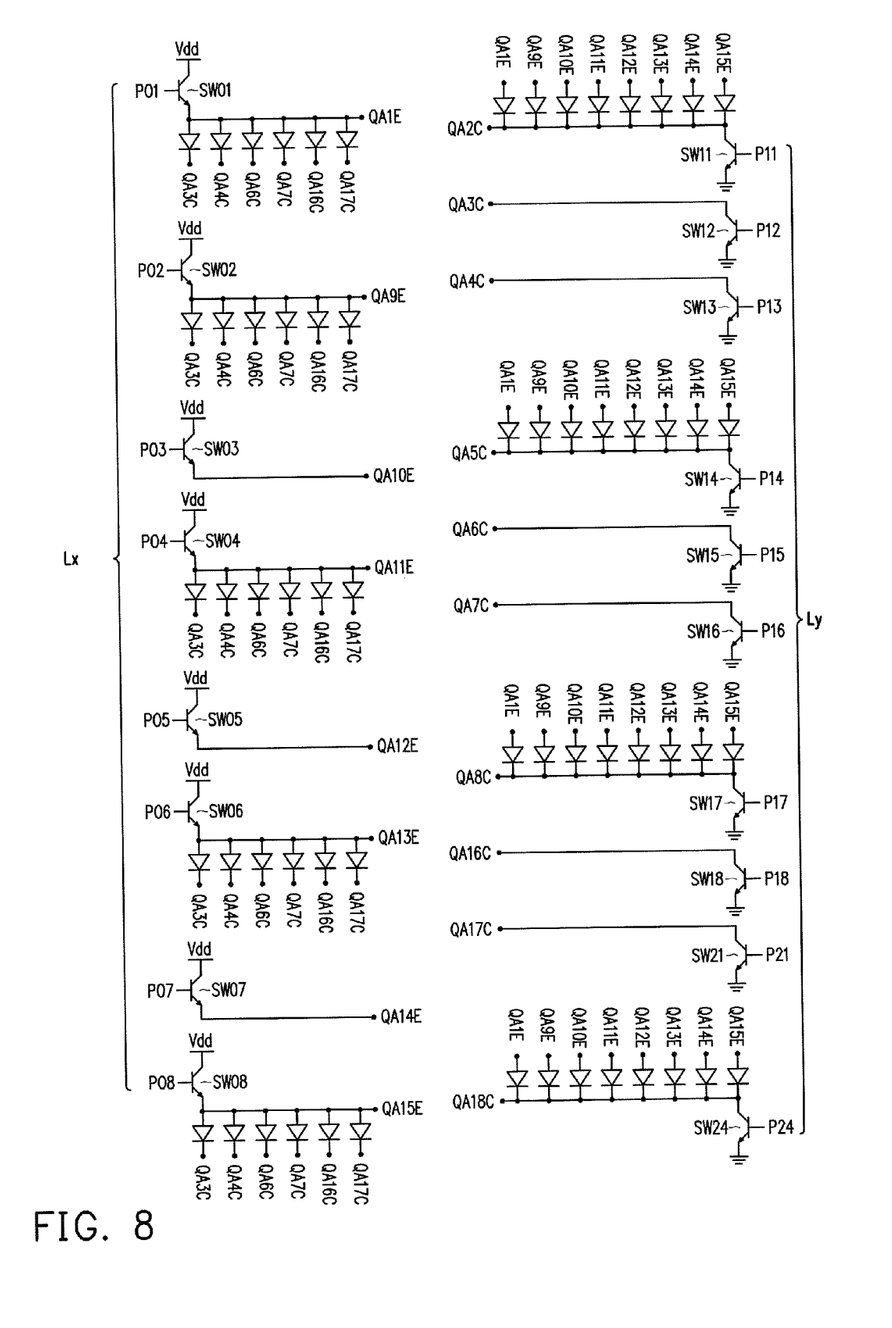
FIG. 8 illustrates a circuitry diagram of the guiding element array as illustrated in FIG. 1 according to another embodiment of the disclosure.

FIG. 8 illustrates a circuitry diagram of the guiding element array 122 as illustrated in FIG. 1 according to another embodiment of the disclosure. In the embodiment of FIG. 8, the guiding element array 122 includes upper switches SW01-SW08, lower switches SW11-SW18, SW21, SW24, and multiple guiding elements (e.g., the guiding element DA(1,1)). In the embodiment of FIG. 8, the first-axis position code Lx includes bits P01-P08, and the second-axis position code Ly includes bits P11-P18, P21, and P24.

The upper switches SW01-SW08 are respectively controlled by the bits P01-P08 of the first-axis position code Lx. A first end of each of the upper switches SW01-SW08 is coupled to a first voltage (e.g., a system voltage Vdd or other power voltages). A second end of each of the upper switches SW01-SW08 is respectively coupled to a corresponding node. For example, the second end of the upper switch SW01 is coupled to a node QA1E; the second end of the upper switch SW02 is coupled to a node QA9E; the second end of the upper switch SW03 is coupled to a node QA10E; the second end of the upper switch SW04 is coupled to a node QA11E; the second end of the upper switch SW05 is coupled to a node QA12E; the second end of the upper switch SW06 is coupled to a node QA13E; the second end of the upper switch SW07 is coupled to a node QA14E; the second end of the upper switch SW08 is coupled to a node QA15E.

The lower switches SW11-SW18, SW21, and SW24 are respectively controlled by the bits P11-P18, P21, and P24 of the second-axis position code Ly. A first end of each of the lower switches SW11-SW18, SW21, and SW24 is coupled to a second voltage (e.g., a ground voltage GND or other reference voltages). A second end of each of the lower switches SW11-SW18, SW21, and SW24 is respectively coupled to a corresponding node. For example, the second end of the lower switch SW11 is coupled to a node QA2C; the second end of the lower switch SW12 is coupled to a node QA3C; the second end of the lower switch SW13 is coupled to a node QA4C; the second end of the lower switch SW14 is coupled to a node QA5C; the second end of the lower switch SW15 is coupled to a node QA6C; the second end of the lower switch SW16 is coupled to a node QA7C; the second end of the lower switch SW17 is coupled to a node QA8C; the second end of the lower switch SW18 is coupled to a node QA16C; the second end of the lower switch SW21 is coupled to a node QA17C; the second end of the lower switch SW24 is coupled to a node QA18C.

A first end (e.g., the anode of LED) and a second end (e.g., the cathode of LED) of each of the guiding elements in the guiding element array 122 are respectively coupled to the corresponding nodes. For example, the first end of the guiding element DA(1,1) is coupled to the node QA1E; the second end of the guiding element DA(1,1) is coupled to the node QA3C. The other guiding elements may refer to FIG. 8 and would not be repeated hereinafter.

Figure 9:
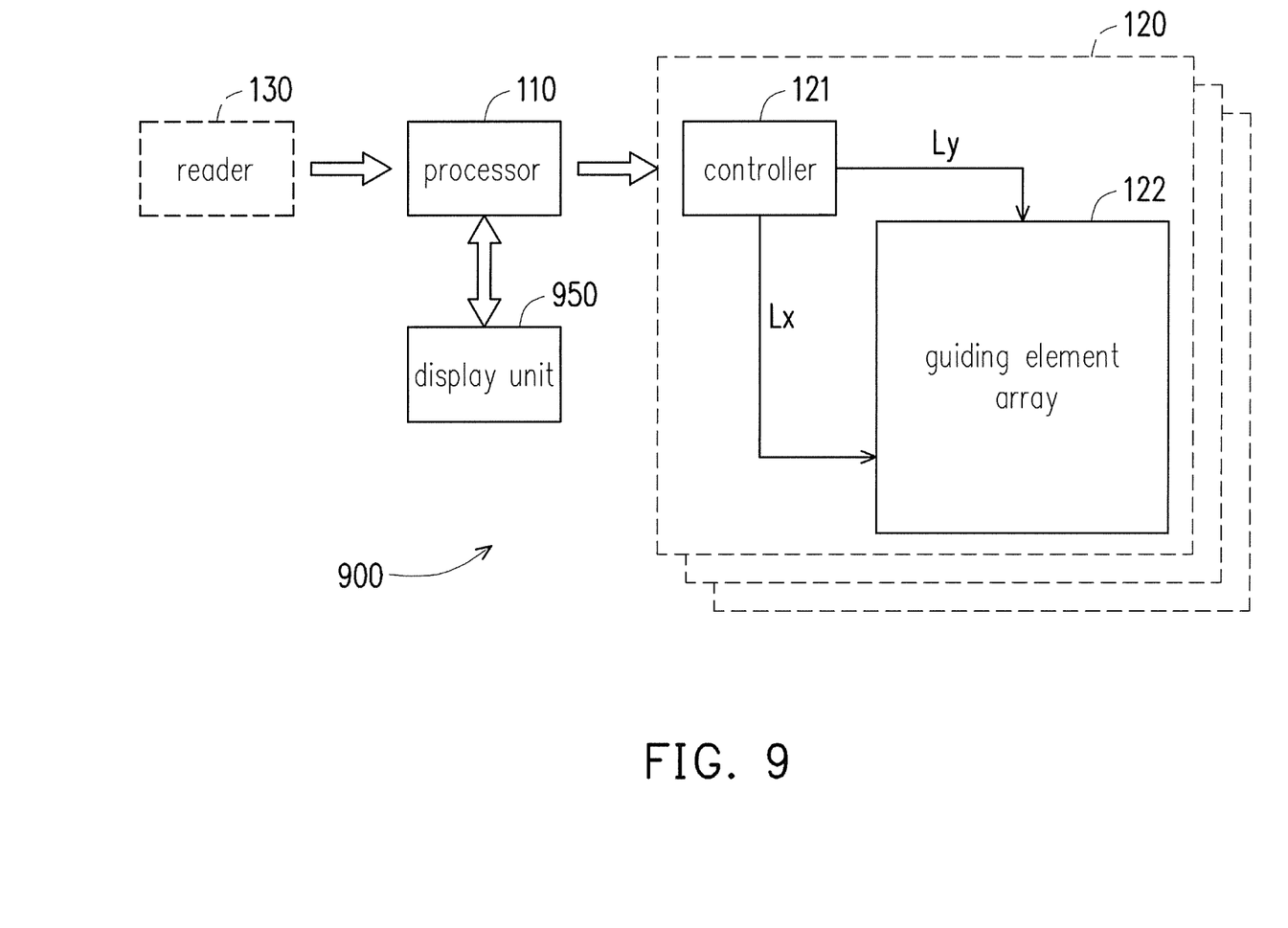
FIG. 9 illustrates a block diagram of circuitry of an object position guiding device according to another embodiment of the disclosure.

FIG. 9 illustrates a block diagram of circuitry of an object position guiding device 900 according to another embodiment of the disclosure. The object position guiding device 900 includes the processor 110 and the guiding module 120. The processor 110, the guiding module 120, the controller 121, the guiding element array 122, and the reader may refer to the related description in FIG. 1-FIG. 8 and would not be repeated hereinafter.

The object position guiding device 900 as illustrated in FIG. 9 further includes a display unit 950, wherein the display unit 950 is coupled to the processor 110. Based on design needs, the processor 110 and the display unit 950 could have different configurations. In some embodiments, the processor 110 and the display unit 950 may be different computational platforms with communication capability. For example, the processor 110 may be, but not limited to, a personal computer or a server. The display unit 950 may be a laptop computer, a tabular computer, or a mobile phone. In some other embodiments, the processor 110 and the display unit 950 may be two different components disposed in a same case, and the processor 110 and the controller 121 may be connected to each other via a metal electrical path.

In some embodiments, the processor 110 and the display 950 may communicate with each other via a wired or wireless communication interface. The wireless communication interface could be a Wireless Fidelity (WiFi) communication interface, a Bluetooth communication interface, a ZigBee communication interface, and/or other wireless communication interfaces. The wired communication interface could be a local area network interface, a Universal Serial Bus (USB) interface, and/or other wired communication interfaces.

The display unit 950 may display positions of different objects in the field. The display unit 950 may point to a storage position of a corresponding object in the field. Hence, when the object position guiding device 900 is applied to a large-area field, the display unit 950 may quickly and accurately guide the user to a target position. After the user arrives the target position, the guiding element array 122 disposed at the target position may point to a storage position of the target object. Hence, the object position guiding device 900 may guide the user to obtain the target object in a large-area field in a quick and accurate fashion.

In some other embodiments, the display unit 950 further provides a touch feature. The user may select one or more designated objects from all objects displayed on the display unit 950. The processor 110 may look up the designated object from a database and drive the guiding element array 122 through the controller 121 so as to allow at least one corresponding guiding element among the guiding elements to point to a storage position of the designated object in the field.

Figure 10:
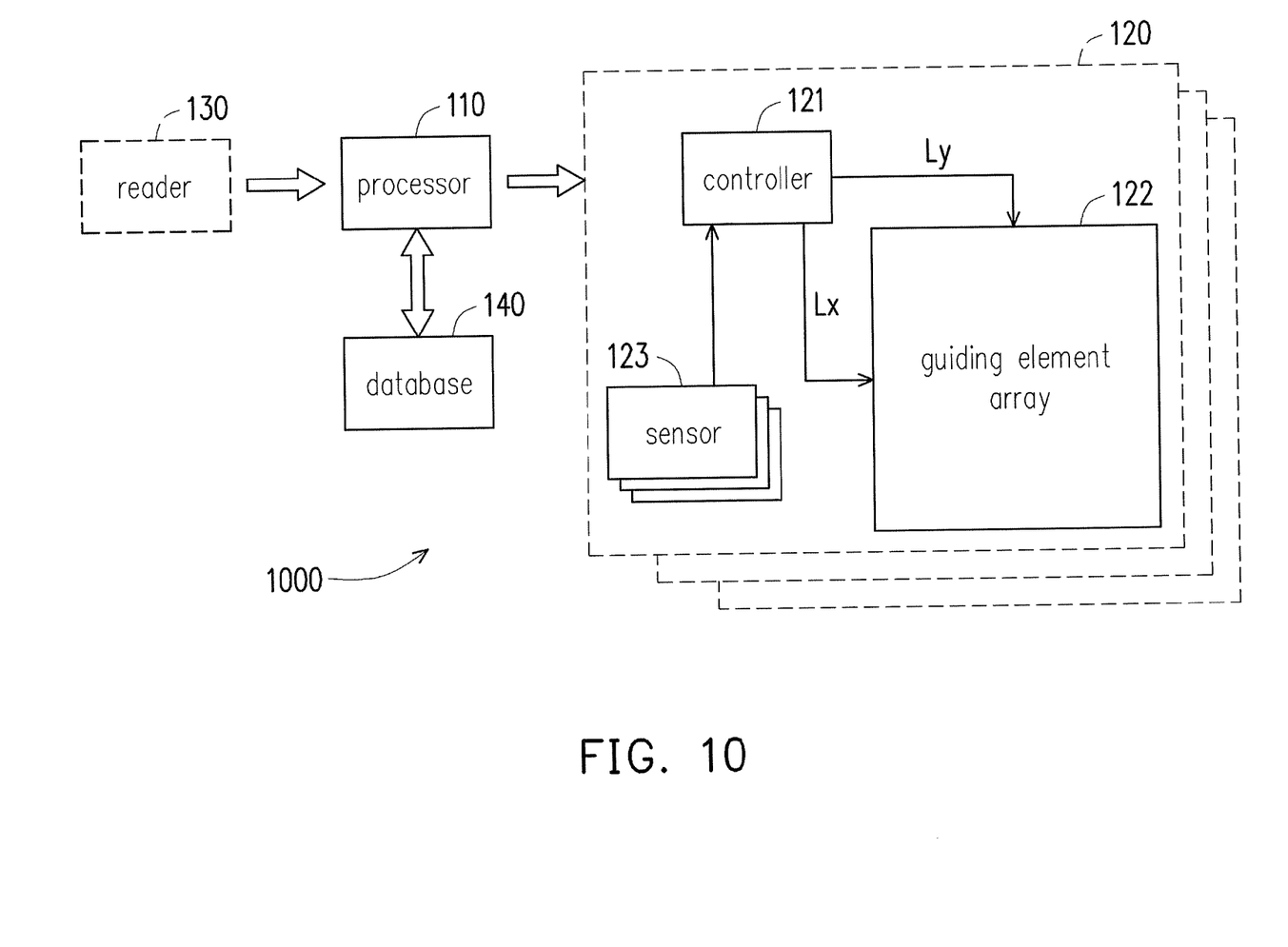
FIG. 10 illustrates a block diagram of circuitry of an object position guiding device according to another embodiment of the disclosure.

FIG. 10 illustrates a block diagram of circuitry of an object position guiding device 1000 according to another embodiment of the disclosure. The object position guiding device 1000 includes the processor 110 and the guiding module 120. The processor 110, the guiding module 120, the controller 121, the guiding element array 122, and the reader may refer to the related description in FIG. 1-FIG. 9 and would not be repeated hereinafter. In the embodiment of FIG. 10, the object position guiding device 1000 further includes multiple sensors 123. The sensors 123 are coupled to the controller 121 and respectively disposed at storage positions of different objects in a field. When the user picks up an object from its storage position, the corresponding sensor 123 would detect that the object has left its storage position. Thus, the controller 121 could detect pickup statuses of the different objects via the sensors 123 and transmit the pickup statuses of the different objects to the processor 110.

In an application scenario, the object position guiding device 1000 may be applied to, but not limited to, a field having a medicine cabinet such as a pharmacy in a hospital. The sensors 123 may be disposed at different drawers in the medicine cabinet. The sensing mechanism of the sensors 123 is not limited in the present embodiment. For example, when one of the drawers in the medicine cabinet is used for storing medicine boxes, its corresponding sensor 123 may be a bar code reader for scanning bar codes of the medicine boxes or a radio frequency identification (RFID) reader for scanning RFID tags of the medicine boxes. As another example, when one of the drawers in the medicine cabinet is used for storing tab medicine or liquid medicine, its corresponding sensor 123 may be a gravity sensor for detecting the weight of the tab medicine (or the liquid medicine). The controller 121 may know the pickup status of the tab medicine (or the liquid medicine) according to a weight difference of the tab medicine (or the liquid medicine) before and after the pickup and further transmit the pickup status to the processor 110.

In another application scenario, the object position guiding device 1000 may be applied to a field having shelves (e.g., shelves in a warehouse or in a market). The sensors 123 may be disposed at different positions of the shelves. The sensors 123 disposed at the shelves may be RFID readers for reading RFID tags of items (or products) on the shelves. When the user picks up an item (or a product) from its storage shelf, the corresponding sensor 123 would detect that the item (or the product) has left its storage shelf. Thus, the controller 121 could detect pickup statuses of the items (or the products) via the sensors 123 and transmit the pickup statuses of the items (or the products) to the processor 110.

The controller 121 may detect pickup statuses of different objects (such as medicine, items, products, or other objects) via the sensors 123 and transmit the pickup statuses to the processor 110. The processor 110 may manage inventory statuses of the different objects based on the pickup statuses. For example, the processor 110 may manage the quantities of inventory of the different objects by analyzing and/or performing statistics on the pickup statuses so as to assist an inventory manager to update the quantities of the inventory. Also, the processor 110 may analyze and/or perform statistics on the pickup statuses and an object list so as to acquire a status and/or trend on a particular object used by a particular population (e.g., males, females, patients who suffer from a particular disease).

This embodiment can also be applied to "terminal, network, cloud, service" architecture, or other industrial/commercial applications. Terminal equipment (controller 121 and/or processor 110) is connected to the cloud server (not shown) via a network (such as Internet or other communication network). The terminal equipment (controller 121 and/or processor 110) could upload the pickup statuses of the different objects to the cloud server (not shown) via the network. The cloud server (not shown) may analyze and/or perform statistics on the relation between the pickup statuses and an object list to acquire a status and/or trend on a particular object used by a particular population (e.g., males, females, patients who suffer from a particular disease), so as to obtain an analysis result. Based on the analysis result, the cloud server (not shown) may provide the corresponding service, such as services for stock management (inventory statuses management), using trend analysis services for the particular object, marketing services and/or other services.

It should be noted that, in various application scenarios, the functionalities of the processor 110, the controller 121, the database 140, and/or the display unit 950 in the aforesaid embodiments may be software, firmware, or hardware implemented by programming languages (e.g., C, C++), hardware description languages (e.g., Verilog HDL or VHDL), or other suitable programming languages. The software (or the firmware) able to execute the functionalities may be recorded in any computer-accessible medias such as magnetic tapes, semiconductors memory, magnetic disks, or compact disks (e.g., CD-ROM or DVD-ROM) or obtained via the Internet, wired communication, wireless communication or other communication medias. The software (or the firmware) may be stored in a computer-accessible media so as to allow a processor of a computer to access/execute programming codes of the software (or the firmware). The device and the method of the disclosure may also be implemented by a combination of hardware and software.

In summary, the embodiments in the disclosure may quickly and accurately guide the user to obtain a target object. For example, a pharmacist may scan a prescription from a doctor by using a two-dimensional bar code reader, and the object position guiding device may quickly and accurately point to a storage position of medicine listed in the prescription by using the guiding element array. Hence, the object position guiding device may reduce medication error and medical malpractice due to human carelessness as well as enhance the effectiveness to make up prescriptions. Moreover, the guiding element array may be disposed in the existing object position guiding device so as to attain simple deployment and low construction cost. The disclosure provides an object location guiding device and an operation method thereof that allow the user to locate a target object in a field in a quick and accurate fashion.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An object position guiding device comprising:
    a guiding element array, comprising a plurality of guiding elements, wherein the guiding elements are adapted to be disposed at different positions in a field so as to point to storage positions of different objects in the field, wherein the field comprises at least one cabinet, the storage positions are a plurality of cases of each of the at least one cabinet, and wherein the guiding elements are respectively disposed at a peripheral portion of each of the cases;
    a processor, configured to convert object data in an object list to storage-position information; and
    a controller, configured to receive the storage-position information from the processor, convert the storage-position information to a first-axis position code and a second-axis position code, and drive the guiding element array by using the first-axis position code and the second-axis position code so as to allow at least one corresponding guiding element among the guiding elements to point to a storage position of a corresponding object in the field,
    wherein the guiding element array further comprises:
        a first upper switch, controlled by a first bit of the first-axis position code, wherein a first end of the first upper switch is coupled to a first voltage, and a second end of the first upper switch is coupled to a first end of each of a plurality of guiding elements in a first row among the guiding elements;
        a second upper switch, controlled by a second bit of the first-axis position code, wherein a first end of the second upper switch is coupled to the first voltage, and a second end of the second upper switch is coupled to a first end of each of a plurality of guiding elements in a second row among the guiding elements;
        a first lower switch, controlled by a first bit of the second-axis position code, wherein a first end of the first lower switch is coupled to a second voltage, and a second end of the first lower switch is coupled to a second end of each of a plurality of guiding elements in a first column among the guiding elements; and
        a second lower switch, controlled by a second bit of the second-axis position code, wherein a first end of the second lower switch is coupled to the second voltage, and a second end of the second lower switch is coupled to a second end of each of a plurality of guiding elements in a second column among the guiding elements.

2. The object position guiding device according to claim 1, wherein the controller comprises a Bluetooth system-on-chip.

3. The object position guiding device according to claim 1 further comprising:

a reader, coupled to the processor, and configured to read list information from the object list and transmit the list information to the processor, wherein the processor looks up the object data from a database according to the list information.

4. The object position guiding device according to claim 1 further comprising:
a reader, coupled to the processor, and configured to read the object data from the object list and transmit the object data to the processor, wherein the processor looks up the storage-position information from a database according to the object data.

5. The object position guiding device according to claim 1 further comprising:
a display unit, coupled to the processor, and configured to display positions of the different objects in the field and point to the storage position of the corresponding object in the field.

6. The object position guiding device according to claim 1 further comprising:
a display unit, coupled to the processor, and configured to display positions of the different objects in the field, wherein the display unit provides a touch feature so as to allow a user to select a designated object from the different objects displayed on the display unit, wherein the processor is configured to look up the designated object from a database and drive the guiding element array via the controller so as to allow at least one corresponding guiding element among the guiding elements point to a storage position of the designated object in the field.

7. The object position guiding device according to claim further comprising:
a plurality of guiding modules, coupled to the processor, wherein the processor is configured to convert the object data to a third-axis position code and select a corresponding guiding module from the guiding modules by using the third-axis position code, wherein the corresponding guiding module comprises the processor and the guiding element array, wherein each of the at least one cabinet comprises a plurality of drawers associated with the third-axis position code, and each of the cases is within one of the drawers.

8. The object position guiding device according to claim 1 further comprising:
a plurality of sensors, coupled to the controller, wherein the sensors are respectively disposed at the storage positions of the different objects, and wherein the controller detects pickup statuses of the different objects via the sensors and transmits the pickup statuses of the different objects to the processor.

9. The object position guiding device according to claim 8, wherein the processor manages inventory statuses of the different objects according to the pickup statuses of the different objects.

10. The object position guiding device according to claim 1, wherein the guiding elements are respectively disposed at the peripheral portion on top of each of the cases.

11. An operation method of an object position guiding device comprising:
disposing a plurality of guiding elements of a guiding element array at different positions in a field so as to point to storage positions of different objects in the field, wherein the field comprises at least one cabinet, the storage positions are a plurality of cases of each of the at least one cabinet, and wherein the guiding elements are respectively disposed at a peripheral portion of each of the cases;
converting object data in an object list to storage-position information by a processor;
converting the storage-position information to a first-axis position code and a second-axis position code by a controller; and
driving the guiding element array by using the first-axis position code and the second-axis position code so as to allow at least one corresponding guiding element among the guiding elements to point to a storage position of a corresponding object in the field,
wherein the guiding element array further comprises:
a first upper switch, controlled by a first bit of the first-axis position code, wherein a first end of the first upper switch is coupled to a first voltage, and a second end of the first upper switch is coupled to a first end of each of a plurality of guiding elements in a first row among the guiding elements;
a second upper switch, controlled by a second bit of the first-axis position code, wherein a first end of the second upper switch is coupled to the first voltage, and a second end of the second up er switch is coupled to a first end of each of a plurality of guiding elements in a second row among the guiding elements;
a first lower switch, controlled by a first bit of the second-axis position code, wherein a first end of the first lower switch is coupled to a second voltage, and a second end of the first lower switch is coupled to a second end of each of a plurality of guiding elements in a first column among the guiding elements; and
a second lower switch, controlled by a second bit of the second-axis position code, wherein a first end of the second lower switch is coupled to the second voltage, and a second end of the second lower switch is coupled to a second end of each of a plurality of guiding elements in a second column among the guiding elements.

12. The operation method of the object position guiding device according to claim 11, wherein the controller comprises a Bluetooth system-on-chip.

13. The operation method of the object position guiding device according to claim 11 further comprising:
reading list information from the object list by a reader; and
looking up the object data from a database according to the list information by the processor.

14. The operation method of the object position guiding device according to claim 11, wherein the step of converting the object data in the object list to the storage-position information comprising:
reading the object data from the object list by a reader; and
looking up the storage-position information from a database according to the object data by the processor.

15. The operation method of the object position guiding device according to claim 11 further comprising:
displaying positions of the different objects in the field and point to the storage position of the corresponding object in the field by a display unit.

16. The operation method of the object position guiding device according to claim 11 further comprising:
displaying positions of the different objects in the field by a display unit;

providing a touch feature by the display unit so as to allow a user to select a designated object from the different objects displayed on the display unit;

looking up the designated object from a database by the processor; and driving the guiding element array via the controller by the processor so as to allow at least one corresponding guiding element among the guiding elements point to a storage position of the designated object in the field.

17. The operation method of the object position guiding device according to claim 11 further comprising:

converting the object data to a third-axis position code by the processor; and selecting a corresponding guiding module from a plurality of guiding modules by using the third-axis position code by the processor, wherein the corresponding guiding module comprises the processor and the guiding element array, wherein each of the at least one cabinet comprises a plurality of drawers associated with the third-axis position code, and each of the cases is within one of the drawers.

18. The operation method of the object position guiding device according to claim 11 further comprising:

disposing a plurality of sensors at the storage positions of the different objects, wherein the sensors are coupled to the controller; and detecting pickup statuses of the different objects via the sensors and transmitting the pickup statuses of the different objects to the processor by the controller.

19. The operation method of the object position guiding device according to claim 18 further comprising:

managing inventory statuses of the different objects according to the pickup statuses of the different objects.

\* \* \* \* \*